US012589593B2

(12) United States Patent
Otana

(10) Patent No.: US 12,589,593 B2
(45) Date of Patent: Mar. 31, 2026

(54) INKJET RECORDING APPARATUS

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 160 days.

(21) Appl. No.: 18/750,048

(22) Filed: Jun. 21, 2024

(65) Prior Publication Data

US 2024/0424796 A1 Dec. 26, 2024

(30) Foreign Application Priority Data

Jun. 26, 2023 (JP) ................................ 2023-104390

(51) Int. Cl.
*B41J 2/17* (2006.01)
*B41J 2/165* (2006.01)
*B41J 2/185* (2006.01)

(52) U.S. Cl.
CPC .... *B41J 2/16523* (2013.01); *B41J 2002/1853* (2013.01)

(58) Field of Classification Search
CPC .... B41J 2/1721; B41J 2/1742; B41J 2/16523; B41J 2002/1853
See application file for complete search history.

(56) References Cited

U.S. PATENT DOCUMENTS

2006/0132572 A1* 6/2006 Mochizuki ........... B41J 2/16585 347/104
2010/0231676 A1* 9/2010 Miyagi ................ B41J 11/0085 347/104
2022/0305791 A1* 9/2022 Somete ................ B41J 2/16514

FOREIGN PATENT DOCUMENTS

JP H 06-340092 A 12/1994

* cited by examiner

*Primary Examiner* — Scott A Richmond
(74) *Attorney, Agent, or Firm* — Stein IP LLC

(57) ABSTRACT

An inkjet recording apparatus includes a recording head, a waste ink container, and a suction mechanism. The waste ink container has a plurality of receiving ports to receive ink, a suction port, and a plurality of suction air passages configured to communicate between a destination receiving port and the suction port. The suction air passages include a plurality of first air passages connected to one first receiving port, and a plurality of second air passages respectively connected to a plurality of second receiving ports, so as to extend to the suction port. The plurality of first air passages respectively join the second air passages different to each other, so as to communicate between the first receiving port and the suction port.

4 Claims, 11 Drawing Sheets

INKJET RECORDING APPARATUS

INCORPORATION BY REFERENCE

This application is based upon and claims the benefit of priority from the corresponding Japanese Patent Application No. 2023-104390 filed Jun. 26, 2023, the entire contents of which are hereby incorporated by reference.

BACKGROUND

The present disclosure relates to an inkjet recording apparatus.

A conventional inkjet recording apparatus is provided with a waste ink container that stores waste ink to be discarded. The waste ink container is connected to a suction mechanism. The suction mechanism sucks gases from the waste ink container. The gases sucked by the suction mechanism flows in an air passage formed in the waste ink container. Note that the gases contain ink mist.

SUMMARY

An inkjet recording apparatus of the present disclosure includes a recording head, a waste ink container, and a suction mechanism. The recording head ejects ink to a recording medium during conveyance so as to record an image. The waste ink container is disposed to face the recording head in a predetermined direction via a recording medium conveying path, and includes a storage region inside, so as to store ink ejected from the recording head without being used for image recording, in the storage region. The suction mechanism sucks gases from the waste ink container. The waste ink container has a plurality of receiving ports, a suction port, and a plurality of suction air passages. The plurality of receiving ports receive the ink ejected from the recording head. The suction port is disposed at a position apart from each of the plurality of receiving ports viewed from the predetermined direction, and is connected to the suction mechanism. The plurality of suction air passages are connected to one of the plurality of receiving ports, so that communication between the destination receiving port and the suction port allows a suction air flow to pass, which is generated when the suction mechanism is driven. The suction air passages include a plurality of first air passages and a plurality of second air passages. The plurality of first air passages are connected to a first receiving port as one of the plurality of receiving ports. The plurality of second air passages are respectively connected to a plurality of second receiving ports other than the first receiving port among the plurality of receiving ports, so as to extend from a destination second receiving port to the suction port. The plurality of first air passages respectively join the second air passages different to each other, without reaching the suction port, so as to communicate between the first receiving port and the suction port.

DETAILED DESCRIPTION

Hereinafter, with reference to FIGS. 1 to 10, an inkjet recording apparatus according to an embodiment of the present disclosure is described by exemplifying a printer 100. The printer 100 is installed on a flat floor and is used in this state. In the following description, a direction perpendicular to the flat floor, on which the printer 100 is installed, is defined as an up and down direction.

In addition, the printer 100 records (i.e., prints) an image on a sheet S as a recording medium. As the sheet S, a paper sheet is mainly used. It may be possible to use other sheets S such as an OHP sheet. In addition, it is also possible to use fabric or cardboard.

<Structure of Printer>

Figure 1:
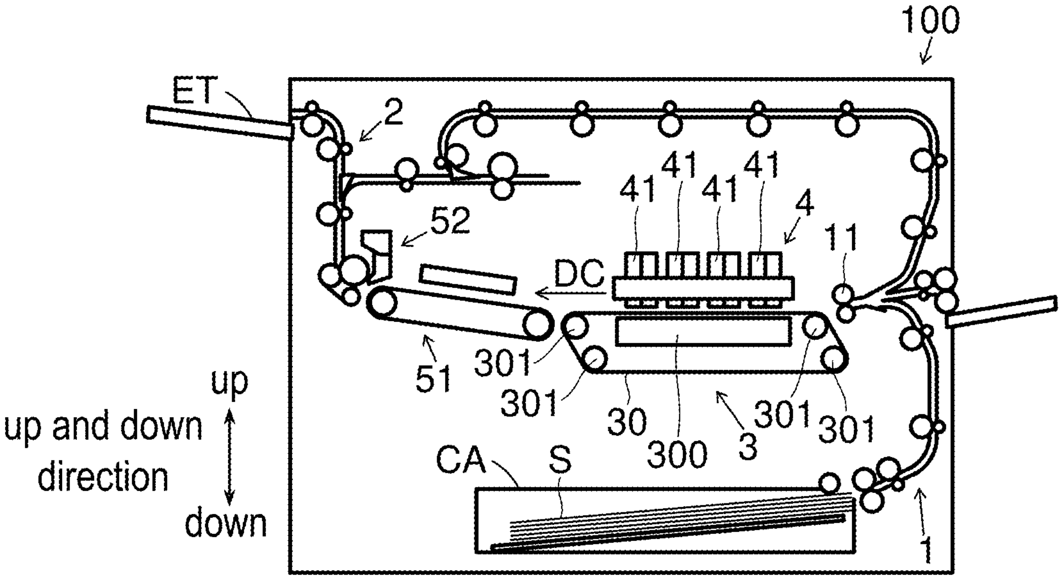
FIG. 1 is a schematic diagram of an inkjet recording apparatus according to an embodiment.

As illustrated in FIG. 1, the printer 100 (corresponding to the "inkjet recording apparatus") of this embodiment includes a first conveying unit 1 and a second conveying unit 2. The first conveying unit 1 feeds the sheet S (corresponding to the "recording medium") set in a sheet feed cassette CA and conveys the same to a recording position. In a print job by the printer 100, image recording (printing) is performed on the sheet S that passes the recording position. The second conveying unit 2 conveys the sheet S after recording. The second conveying unit 2 discharges the sheet S after recording onto a discharge tray ET.

The first conveying unit 1 is provided with a plurality of conveying roller members including a registration roller pair 11. In FIG. 1, only the registration roller pair 11 among the plurality of conveying roller members is denoted by the numeral. The plurality of conveying roller members each rotate so as to convey the sheet S. The registration roller pair 11 includes a pair of rollers pressed to contact each other. A registration nip is formed between the pair of rollers. The sheet S fed from the sheet feed cassette CA enters the registration nip. The registration roller pair 11 rotates so as to convey the sheet S, which has entered the registration nip, to the belt conveying unit 3 described later.

Note that when a front end of the sheet S reaches the registration nip, the registration roller pair 11 is not rotated. On the other hand, the conveying roller members on the upstream side of the registration roller pair 11 in a conveying direction DC of the sheet S are rotating. In this way, a skew of the sheet S is corrected.

The printer 100 includes the belt conveying unit 3. The belt conveying unit 3 receives the sheet S from the first conveying unit 1 and conveys the same. The belt conveying unit 3 includes a conveyor belt 30. The conveyor belt 30 is an endless belt and is supported in a rotatable manner. In addition, the belt conveying unit 3 includes a plurality of tension rollers 301. The plurality of tension rollers 301 are supported in a rotatable manner. The conveyor belt 30 are wrapped and stretched around the plurality of tension rollers 301 so as to rotate. The sheet S conveyed by the first conveying unit 1 reaches an outer peripheral surface of the conveyor belt 30.

One of the plurality of tension rollers 301 is linked to a belt motor (not shown), and is rotated when a drive force of the belt motor is transmitted. When the tension roller 301 linked to the belt motor rotates, the conveyor belt 30 is driven to rotate. In this case, other tension rollers 301 are also driven to rotate.

In addition, the belt conveying unit 3 includes a suction unit 300. The suction unit 300 is disposed on an inner periphery side of the conveyor belt 30. The suction unit 300 sucks the sheet S on the outer peripheral surface of the conveyor belt 30.

Specifically, the conveyor belt 30 has a plurality of suction holes (not shown). The suction holes of the conveyor belt 30 penetrate the conveyor belt 30 in its thickness direction. The suction unit 300 sucks the sheet S through the suction holes of the conveyor belt 30. In this way, the sheet S is sucked onto the outer peripheral surface of the conveyor belt 30. The conveyor belt 30 sucks and holds the sheet S on its outer peripheral surface, and rotates. As a result, the sheet S is conveyed. In other words, the conveyor belt 30 sucks the sheet S on its outer peripheral surface so as to convey the same.

The printer 100 includes a recording unit 4. The recording unit 4 is disposed to face the outer peripheral surface of the conveyor belt 30 in the up and down direction. During conveyance of the sheet S, the sheet S on the outer peripheral surface of the conveyor belt 30 faces the recording unit 4 in the up and down direction with a space therebetween. In this way, during conveyance of the sheet S, the sheet S passes between a nozzle surface of the recording head 40 described later and the outer peripheral surface of the conveyor belt 30. In other words, the space between the nozzle surface of the recording head 40 and the outer peripheral surface of the conveyor belt 30 is a part of the conveying path of the sheet S. In this structure, the conveying direction DC of the sheet S during conveyance by the conveyor belt 30 is the horizontal direction.

Figure 2:
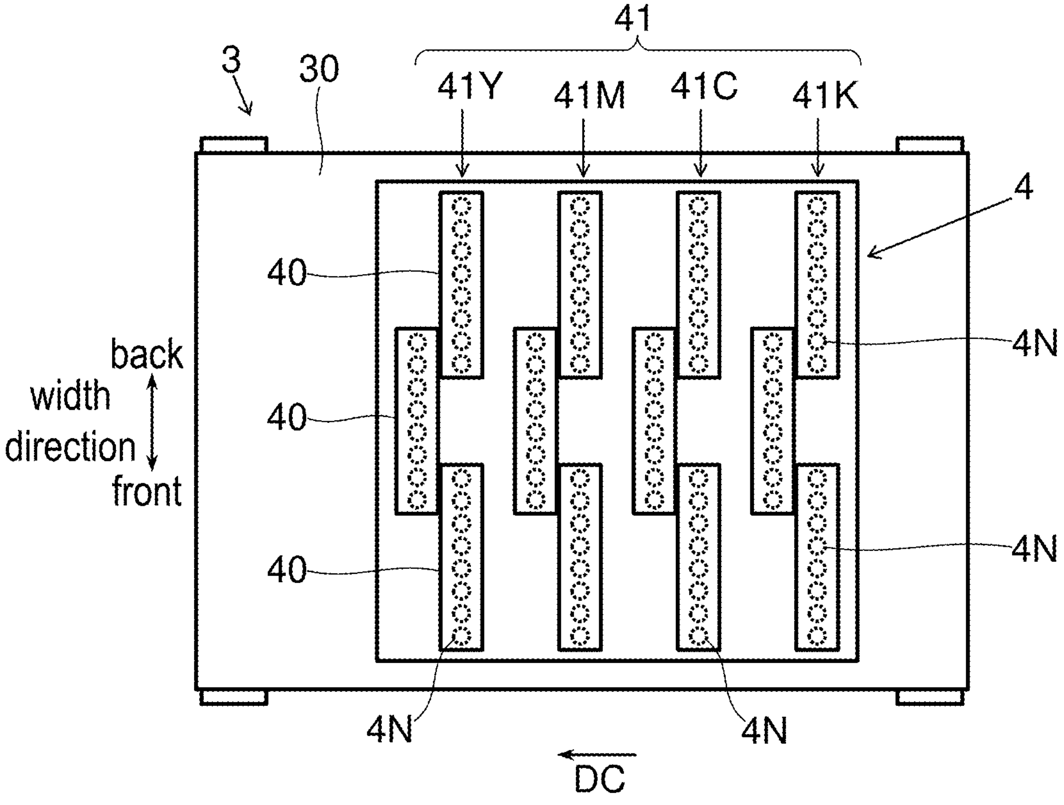
FIG. 2 is a plan view of a recording unit of the inkjet recording apparatus according to the embodiment.

As illustrated in FIG. 2, the recording unit 4 includes four line heads 41 corresponding to cyan, magenta, yellow, and black colors. In FIG. 2, the cyan line head 41 is suffixed by C, the magenta line head 41 is suffixed by M, the yellow line head 41 is suffixed by Y, and the black line head 41 is suffixed by K, so as to discriminate them from each other. The same is true in FIG. 5, which will be referred to in later description.

Each of the color line heads 41 includes a plurality of (e.g., three) recording heads 40. For instance, the plurality of recording heads 40 of each color are arranged in zigzag in a direction perpendicular to the conveying direction DC of the sheet S by the conveyor belt 30. In the following description, the direction perpendicular to the conveying direction DC of the sheet S by the conveyor belt 30 may be simply referred to as a width direction.

The recording heads 40 are disposed to face the outer peripheral surface of the conveyor belt 30 with a space therebetween in the up and down direction. In other words, each of the recording heads 40 is disposed at a position facing the sheet S conveyed by the conveyor belt 30, in the up and down direction. Still in other words, the conveyor belt 30 sucks and conveys the sheet S below the recording heads 40. The up and down direction is a direction perpendicular to the conveying direction DC of the sheet S by the conveyor belt 30 and to the width direction.

Each of the recording heads 40 has a surface facing the outer peripheral surface of the conveyor belt 30 in the up and down direction, as the nozzle surface. The nozzle surface of each recording head 40 is provided with a plurality of nozzles 4N. The plurality of nozzles 4N of each recording head 40 ejects ink of the corresponding color downward. For instance, the recording heads 40 have the same number of nozzles 4N. The plurality of nozzles 4N of each recording head 40 are arranged along the width direction of the conveyor belt 30. In FIG. 2, the nozzle 4N is shown by a broken line. Note that, in reality, more nozzles 4N are provided to each recording head 40. For convenience sake, only a part of the nozzles are denoted by 4N.

Each recording head 40 ejects ink from the nozzles 4N to the sheet S on the outer peripheral surface of the conveyor belt 30, on the basis of image data to be recorded on the sheet S in the print job. The ink ejected from each recording head 40 is adhered to the sheet S. In this way, an image is recorded on the sheet S. In other words, the space between each recording head 40 and the conveyor belt 30 is the recording position, and the image recording is performed on the sheet S in the recording position.

Here, ink viscosity of remaining ink increases more over time in the nozzle 4N whose number of ink ejection times is smaller, among the plurality of nozzles 4N. As a result, clogging may occur, and image quality is lowered. In order to suppress this disadvantage, each recording head 40 performs a flushing process. In the flushing process of each recording head 40, ink remaining in the nozzles 4N is ejected. In this way, clogging is suppressed. The flushing process will be described later in detail.

With reference to FIG. 1 again, the printer 100 includes a drying unit 51 and a decurler 52. The drying unit 51 conveys the sheet S to the decurler 52 and dries ink adhered to the sheet S during conveyance. The decurler 52 corrects a curl of the sheet S. The decurler 52 conveys the sheet S after curl correction to the second conveying unit 2.

Figure 3:
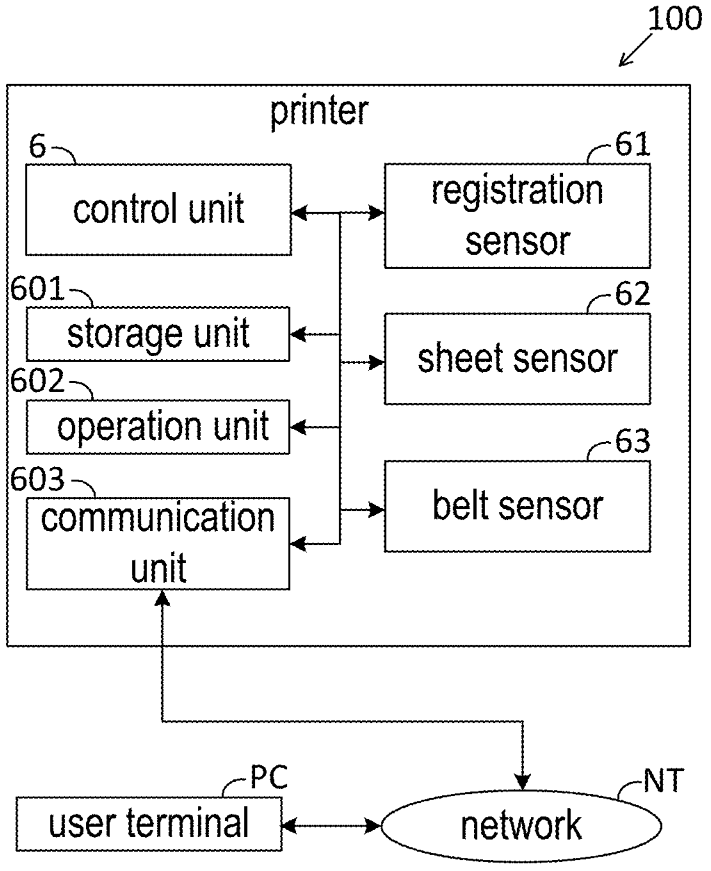
FIG. 3 is a block diagram of the inkjet recording apparatus according to the embodiment.

In addition, as illustrated in FIG. 3, the printer 100 includes a control unit 6. The control unit 6 includes a processing circuit such as a CPU and an ASIC. The control unit 6 controls the print job. In other words, the control unit 6 controls operations of the first conveying unit 1, the second conveying unit 2, the belt conveying unit 3, the recording unit 4, the drying unit 51, and the decurler 52. Still in other words, the control unit 6 controls conveyance of the sheet S and ink ejection of each recording head 40. In addition, the control unit 6 controls the flushing process of each recording head 40.

The control unit 6 is connected to a registration sensor 61, a sheet sensor 62, and a belt sensor 63. The control unit 6 controls the conveyance of the sheet S and the image recording on the sheet S, on the basis of outputs of the registration sensor 61, the sheet sensor 62, and the belt sensor 63.

The registration sensor 61 has a detection position that is a position on the upstream side of the registration nip in the conveying direction DC of the sheet S. The registration sensor 61 is a reflection type or transmission type optical sensor, for example. The registration sensor 61 changes its output value in accordance with presence or absence of the sheet S at the corresponding detection position.

On the basis of the output value of the registration sensor 61, the control unit 6 detects arrival of the front end of the sheet S and passing of the rear end thereof, at the detection position of the registration sensor 61. In other words, on the basis of the output value of the registration sensor 61, the control unit 6 detects arrival of the front end of the sheet S and passing of the rear end thereof at the registration nip. The control unit 6 measures timing of starting the conveyance of the sheet S by the registration roller pair 11 (timing of starting rotation of the registration roller pair 11), on the basis of elapsed time from detection of the arrival of the front end of the sheet S at the detection position of the registration sensor 61.

The sheet sensor 62 determines a position between the registration nip and the recording position of the line head 41, which is disposed on the most upstream side in the conveying direction DC of the sheet S, among the plurality of line heads 41, to be the detection position. The sheet sensor 62 changes its output value in accordance with presence or absence of the sheet S at the corresponding detection position. As the sheet sensor 62, a contact image sensor (CIS) may be used. In addition, as the sheet sensor 62, a reflection type or transmission type optical sensor may be used. For instance, the CIS is used as the sheet sensor 62.

On the basis of the output value of the sheet sensor 62, the control unit 6 detects arrival of the front end of the sheet S and passing of the rear end thereof at the detection position of the sheet sensor 62. On the basis of the output value of the sheet sensor 62, the control unit 6 measures timing of ejecting ink onto the sheet S conveyed by the conveyor belt 30. Note that it may be possible to measure the timing of ejecting ink onto the sheet S conveyed by the conveyor belt 30, on the basis of elapsed time from start of the conveyance of the sheet S by the registration roller pair 11.

In addition, the control unit 6 measures paper passing time, which is time from arrival of the front end of the sheet S at the detection position of the sheet sensor 62 until passing of the rear end of the same sheet S at the detection position of the sheet sensor 62. The paper passing time at the detection position of the sheet sensor 62 varies depending on a size of the sheet S in the conveying direction DC. Therefore, the control unit 6 recognizes the size in the conveying direction DC of the sheet S conveyed by the conveyor belt 30, on the basis of the paper passing time. In this way, even if the sheet S conveyed by the conveyor belt 30 has an irregular size, the control unit 6 can recognize the size of the sheet S in the conveying direction DC.

The belt sensor 63 is a sensor for detecting a predetermined reference position (home position) of the conveyor belt 30. For instance, a predetermined mark is placed at the reference position of the conveyor belt 30. In this way, on the basis of an output value of the belt sensor 63, the reference position of the conveyor belt 30 can be detected. As the belt sensor 63, the CIS may be used. In addition, as the belt sensor 63, a transmission type or reflection type optical sensor may be used.

On the basis of the output value of the belt sensor 63, the control unit 6 detects the reference position of the conveyor belt 30. In other words, on the basis of the output value of the belt sensor 63, the control unit 6 detects a position of a flushing region 31 (flushing holes 30*a*) described later.

In addition, the printer 100 includes a storage unit 601. The storage unit 601 includes storage devices such as a ROM and a RAM. The storage unit 601 is connected to the control unit 6. The control unit 6 reads information from the storage unit 601. In addition, the control unit 6 writes information into the storage unit 601.

The printer 100 includes an operation unit 602. The operation unit 602 includes a touch screen, for example. The touch screen displays software buttons and messages, and receives a touch operation by a user. In addition, the operation unit is also provided with hardware buttons for receiving settings, instructions, and the like. The operation unit 602 is connected to the control unit 6. The control unit 6 controls display operation of the operation unit 602 (the touch screen). In addition, the control unit 6 detects an operation to the operation unit 602.

The printer 100 includes a communication unit 603. The communication unit 603 includes a communication circuit and the like. The communication unit 603 is connected to a user terminal PC via a network NT. The user terminal PC is an information processing device such as a personal computer. The control unit 6 communicates with the user terminal PC using the communication unit 603. For instance, the user terminal PC sends to the printer 100 print data (such as PDL data) including image data to be printed on the sheet S in the print job. In other words, the user terminal PC sends to the printer 100 a request to execute the print job. The print data for the print job includes various setting data concerning the printing, such as a size of the sheet S to be used in the print job.

<Outline of Flushing Process>

Figure 4:
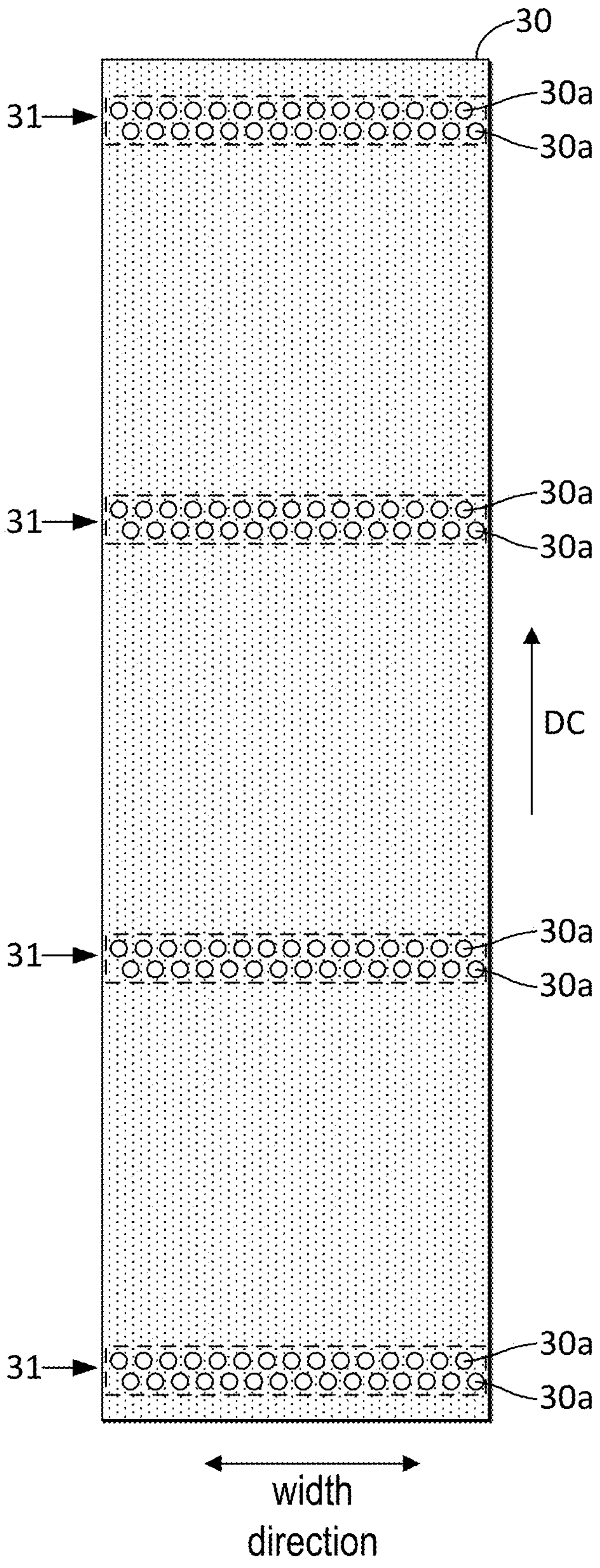
FIG. 4 is a plan view of a conveyor belt of the inkjet recording apparatus according to the embodiment.

As illustrated in FIG. 4, the conveyor belt 30 has the flushing region 31. In FIG. 4, the flushing region 31 is enclosed by a broken line. The flushing region 31 is a region containing the flushing holes 30*a*, which are through holes penetrating the conveyor belt 30 in its thickness direction. The conveyor belt 30 has a plurality of the flushing regions 31. The plurality of flushing regions 31 are disposed with a predetermined interval therebetween in a rotation direction of the conveyor belt 30 (in the conveying direction DC of the sheet S).

Each of the flushing regions 31 has a plurality of the flushing holes 30*a*. An aperture shape of the flushing hole 30*a* (a shape viewed from the thickness direction of the conveyor belt 30) is not particularly limited. The shape of the flushing hole 30*a* may be a circular shape, an ellipse shape, an oval shape, or a rectangular shape. When the conveyor belt 30 rotates, each of the plurality of nozzles 4N faces at least one of the flushing holes 30*a* in the up and down direction.

As the flushing process, a process for ejecting ink from the nozzles 4N of each recording head 40 is performed. When the flushing process is performed, the ink is ejected from each nozzle 4N at timing when it faces the flushing hole 30*a* in the up and down direction. Then, the ink passes through the flushing hole 30*a*. In this way, when the flushing process is performed, the ink does not adhere to the conveyor belt 30. In the following description, the ink ejected from each nozzle 4N when the flushing process is performed is referred to as flushing ink, and is discriminated from ink that contributes to the image recording on the sheet S. The ink that does not contribute to the image recording on the sheet S is the flushing ink.

During execution of the print job, the control unit 6 controls the flushing process. Specifically, the control unit 6 measures the timing of starting the conveyance of the sheet S from the registration roller pair 11 to the conveyor belt 30, so that the flushing region 31 appears at a constant period between paper sheets (between the rear end of the preceding sheet S and the front end of the following sheet S). Further, the control unit 6 controls each nozzle 4N to eject ink at the timing facing the flushing hole 30*a* in the up and down direction, which is not covered by the sheet S. In other words, the control unit 6 controls each nozzle 4N to eject ink at timing different from the image recording timing on the sheet S.

<Storage of Flushing Ink>

The flushing ink is stored in a main body of the printer 100 (hereinafter, simply referred to as an apparatus main body). Further, when the stored amount of the flushing ink reaches a certain amount, the flushing ink is discarded.

Specifically, as illustrated in FIGS. 5 to 10, the printer 100 includes a waste ink container 7, and a suction mechanism 10 connected to the waste ink container 7. The suction mechanism 10 sucks gases from the waste ink container 7.

In the flushing process, the flushing ink passes through the flushing hole 30*a* of the conveyor belt 30, and the flushing ink is sucked as a function of the suction mechanism 10, so that the flushing ink reaches the waste ink container 7. The waste ink container 7 has a storage region inside. The waste ink container 7 stores the flushing ink in the storage region. Note that, due to the suction by the suction mechanism 10, mist of the flushing ink hardly goes out from the waste ink container 7.

A plurality of the waste ink containers 7 are disposed. One waste ink container 7 is disposed for each line head 41. In other words, one waste ink container 7 is disposed for each of cyan, magenta, yellow, and black colors.

The waste ink containers 7 are disposed on the inner periphery side of the conveyor belt 30 in the apparatus main body. In the state where each waste ink container 7 is mounted in the apparatus main body, it is disposed below the recording heads 40 that eject ink of the corresponding color. Each waste ink container 7 is disposed to face the nozzle surface of the corresponding recording heads 40 via the conveyor belt 30. In other words, each waste ink container 7 is disposed to face the corresponding recording heads 40 via the conveying path of the sheet S in the up and down direction. In this way, when the flushing process is performed, the flushing ink passes through the flushing holes 30*a*, and the flushing ink is stored in the storage region of each waste ink container 7. In this structure, the up and down direction corresponds to a "predetermined direction".

Each waste ink container 7 is mounted in the apparatus main body in an attachable and detachable manner. Each waste ink container 7 can be detached from the apparatus main body by pulling it from the front of the printer 100 frontward (to the front in the width direction). When the stored amount of the flushing ink reaches a certain amount in one of the waste ink container 7, the waste ink container 7 is detached from the apparatus main body, and is replaced.

Figure 5:
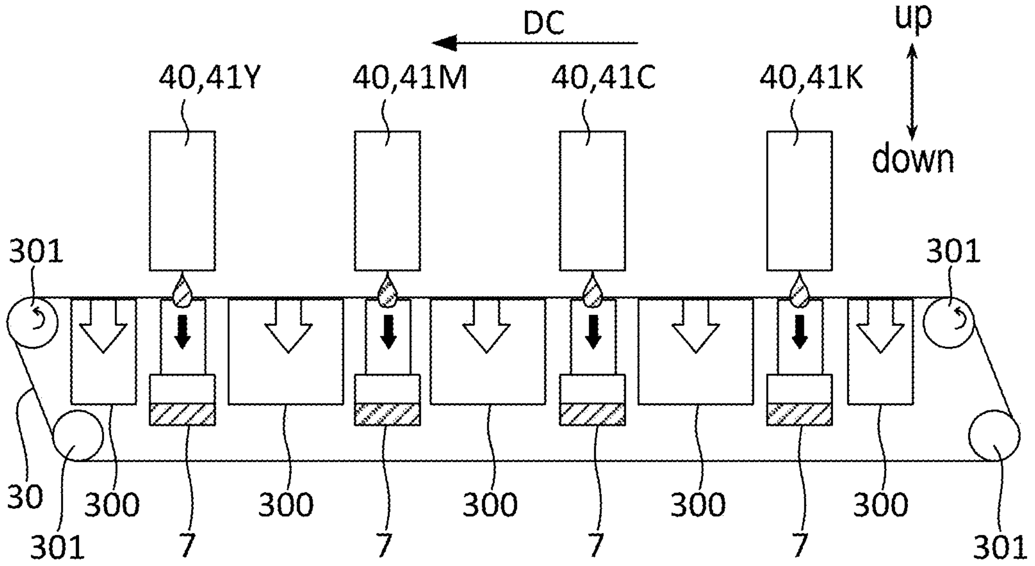
FIG. 5 is a schematic diagram of a conveyor belt and its vicinity of the inkjet recording apparatus according to the embodiment.
Figure 6:
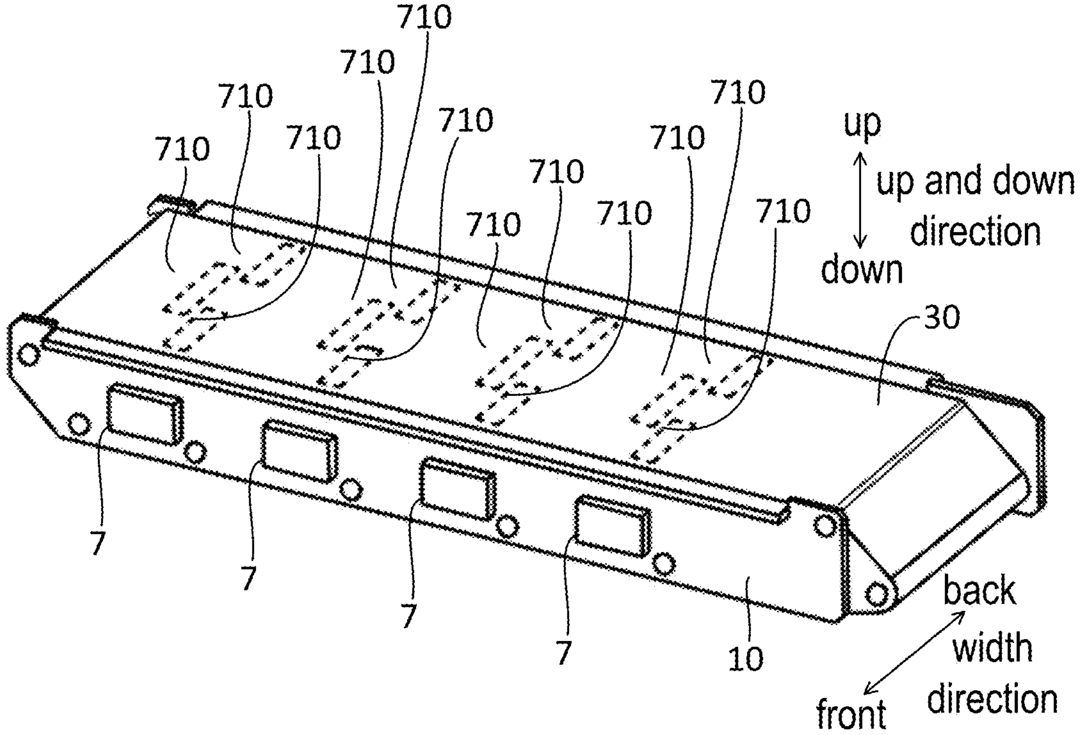
FIG. 6 is a schematic perspective view of the conveyor belt and its vicinity of the inkjet recording apparatus according to the embodiment (a diagram illustrating a state where all waste ink containers are mounted).
Figure 7:
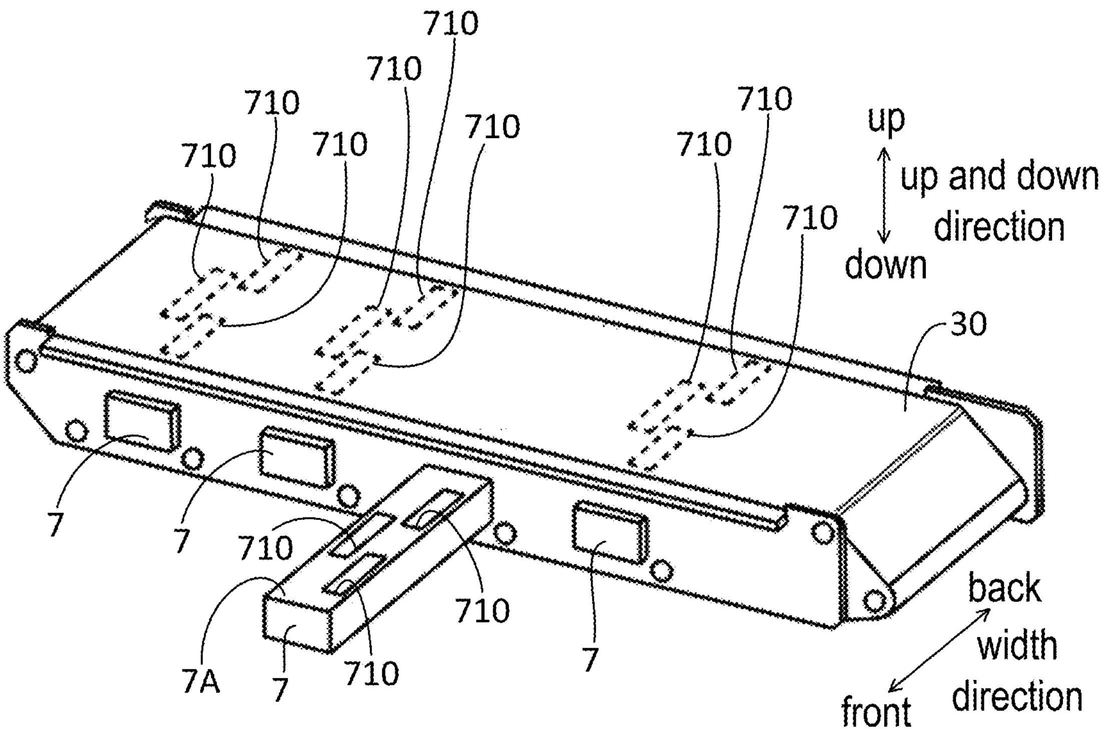
FIG. 7 is a schematic perspective view of the conveyor belt and its vicinity of the inkjet recording apparatus according to the embodiment (a diagram illustrating a state where one of the waste ink containers is detached).

The suction mechanism 10 generates a suction air flow. One suction mechanism 10 is disposed for each waste ink container 7. Each suction mechanism 10 is connected to the corresponding waste ink container 7, so as to suck the flushing ink from the corresponding recording head 40 to the storage region of the waste ink container 7. When the flushing ink is sucked as a function of each suction mechanism 10, it is possible to prevent the flushing ink from contaminating inside of the apparatus. In FIG. 5, a suction direction of the flushing ink is shown by a thick arrow. A white arrow shows a suction direction by the suction unit 300.

Note that each waste ink container 7 stores ink to be discarded, such as flushing ink. The ink to be discarded is ink that is ejected from the recording head 40 but is not used for image recording. In other words, each waste ink container 7 stores ink that does not contribute to image recording. In the following description, for convenience sake, ink to be discarded including the flushing ink is generically referred to as flushing ink.

<Structure of Waste Ink Container>

Hereinafter, with reference to FIGS. 8 and 9, one of the waste ink containers 7 is noted, and a structure thereof is described. The waste ink containers 7 have the same structure. Therefore, descriptions of structures of the other waste ink containers 7 are omitted as to refer to the following description.

The waste ink container 7 has a substantially rectangular shape having a short side in one direction and a long side in the other direction perpendicular to the one direction, in the horizontal direction perpendicular to the up and down direction, viewed from the up and down direction (corresponding to the "predetermined direction"). Therefore, in the following description, in the horizontal direction perpendicular to the up and down direction, the one direction is referred to as a short direction DS, and the other direction perpendicular to the one direction is referred to as a longitudinal direction DL. The short direction DS is a direction parallel to the conveying direction DC of the sheet S by the conveyor belt 30. The longitudinal direction DL is the width direction of the conveyor belt 30 (a direction perpendicular to the rotation direction of the conveyor belt 30).

Note that FIGS. 8 and 9 referred to in the following description schematically illustrate the storage region of the waste ink container 7, but do not show a real size or shape as it is. The same is true for FIGS. 10 and 11.

The waste ink container 7 has a substantially rectangular solid shape. The waste ink container 7 is made of sheet metal, for example. The waste ink container 7 has a ceiling part 7A, and a bottom part 7B that faces the ceiling part 7A in the up and down direction. In addition, the waste ink container 7 has a side wall part (numeral is omitted) that covers side areas between the ceiling part 7A and the bottom part 7B. The waste ink container 7 has an inside region surrounded by the ceiling part 7A, the bottom part 7B, and the side wall part, as the storage region of the flushing ink.

The waste ink container 7 includes an absorbing member 8. The absorbing member 8 is disposed in the storage region of the waste ink container 7. The absorbing member 8 is a porous member that absorbs the flushing ink. As a material of the absorbing member 8, melamine sponge can be used. The absorbing member 8 absorbs the flushing ink, and holds the flushing ink inside.

Here, the waste ink container 7 has a suction air passage 70 in the storage region, which passes the suction air flow generated when the suction mechanism 10 is driven. A plurality of the suction air passages 70 are disposed. The suction air passage 70 is formed as a space without the absorbing member 8 in the storage region of the waste ink container 7 (i.e., a gap in the storage region). For instance, the suction air passage 70 is a space obtained by cut off a part of the absorbing member 8. In other words, the suction air passage 70 is a space surrounded by the absorbing member 8.

The ceiling part 7A functions as an ink receiving part that receives the flushing ink sucked by the suction mechanism 10. Specifically, the ceiling part 7A has a receiving port 710 having a rectangular shape penetrating in the up and down direction. A plurality of the receiving ports 710 are disposed. Note that the receiving port 710 opens upward. In other words, an opening direction of the receiving port 710 is the up and down direction.

One receiving port 710 is disposed for each recording head 40. As there are three recording heads 40, there are three receiving ports 710. Each receiving port 710 faces the corresponding recording head 40 via the conveyor belt 30 (i.e., the conveying path of the sheet S) in the up and down direction. Therefore, the receiving ports 710 are disposed with an interval therebetween, viewed from the up and down direction.

Each receiving port 710 is an opening for collecting the flushing ink ejected from the corresponding recording head 40 into the storage region of the waste ink container 7. The flushing ink from each recording head 40 passes through the corresponding receiving port 710 and reaches the storage region of the waste ink container 7.

A cylindrical duct 731 is disposed in the storage region of the waste ink container 7. A cylinder axis of the duct 731 extends in the up and down direction. The duct 731 has an opening on one end side in the up and down direction, as a suction port 730. In other words, the waste ink container 7 has the suction port 730.

The bottom part 7B has a connection port (numeral is omitted) that penetrates in the up and down direction. The duct 731 has a cylindrical shape extending upward from an edge of the connection port of the bottom part 7B. The suction mechanism 10 is disposed outside the waste ink container 7, and is connected to the connection port of the bottom part 7B. In other words, the suction mechanism 10 is connected to the duct 731. The duct 731 may be a hole part obtained by boring a part of the absorbing member 8 in the up and down direction, or a tube member disposed in the hole part may be the duct 731.

The suction air passage 70 is provided for each of the three receiving ports 710. In other words, the waste ink container 7 has a plurality of suction air passages 70. Each of the plurality of suction air passages 70 communicates between the destination receiving port 710 and the suction port 730. In FIG. 8, three receiving ports 710 are each shown by a broken line. Note that the suction port 730 is disposed at a position apart from each of the three receiving ports 710, viewed from the up and down direction.

Among the three receiving ports 710, one receiving port 710 is disposed apart from the suction port 730 in the short direction DS, viewed from the up and down direction. This one receiving port 710 is disposed in a middle part in the longitudinal direction DL of the waste ink container 7 (specifically, the ceiling part 7A), viewed from the up and down direction. In the following description, this one receiving port 710 is referred to as a middle receiving port 711. An aperture shape of the middle receiving port 711 viewed in the up and down direction is a substantially rectangular shape whose longitudinal direction is the longitudinal direction DL. The middle receiving port 711 corresponds to a "first receiving port".

Among the three receiving ports 710, two receiving ports 710 other than the middle receiving port 711 are disposed to sandwich the suction port 730, with an interval therebetween in the longitudinal direction DL, viewed from the up and down direction. One of the two receiving ports 710 is disposed on the back side (one side in the width direction), and the other is disposed on the front side (the other side in the width direction). In the following description, out of the two receiving ports 710, one is referred to as a back side receiving port 712, and the other is referred to as a front side receiving port 713. An aperture shape of each of the back side receiving port 712 and the front side receiving port 713, viewed in the up and down direction, is a substantially rectangular shape whose longitudinal direction is the longitudinal direction DL. The back side receiving port 712 and the front side receiving port 713 each correspond to a "second receiving port".

Hereinafter, in order to discriminate the plurality of suction air passages 70 from each other, the suction air passage 70 connected to the middle receiving port 711 may be denoted by 71, the suction air passage 70 connected to the back side receiving port 712 may be denoted by 72, and the suction air passage 70 connected to the front side receiving port 713 may be denoted by 73, in the following description.

<Shape of Suction Air Passage>

The suction air flow contains flushing ink mist. If the flushing ink mist leaks through the suction port 730, it causes contamination inside the printer 100 or other disadvantages. In order to suppress occurrence of such disadvantages, it is necessary to appropriately separate between gases flowing in the suction air passage 70 (i.e., gases sucked by the suction mechanism 10) and the flushing ink, in the storage region of the waste ink container 7, so as to allow the absorbing member 8 to absorb the flushing ink. In other words, it is necessary to improve collection efficiency of the flushing ink in the storage region of the waste ink container 7.

In order to improve the collection efficiency of the flushing ink in the storage region of the waste ink container 7, an inner wall of each suction air passage 70 is made of the absorbing member 8. In this structure, when the flushing ink is absorbed by the absorbing member 8, the collection efficiency of the flushing ink is improved. As each suction air passage 70 is bent more, the flushing ink contained in the gases flowing in the suction air passage 70 can be separated more easily by centrifugal force, and hence the collection efficiency of the flushing ink is improved.

In order to improve the collection efficiency of the flushing ink, each of the suction air passages 72 and 73 is bent a plurality of times from the destination receiving port 710 (i.e., the back side receiving port 712 or the front side receiving port 713) to the suction port 730, viewed from the up and down direction. Each of the suction air passages 72 and 73 has a part bent from the short direction DS to the longitudinal direction DL, and a part bent from the longitudinal direction DL to the short direction DS, viewed from the up and down direction. In other words, each of the suction air passages 72 and 73 has a bent part that is bent like bellows, viewed from the up and down direction. In this way, in the suction air passages 72 and 73, the flushing ink can be separated from the gases more easily.

Figure 11:
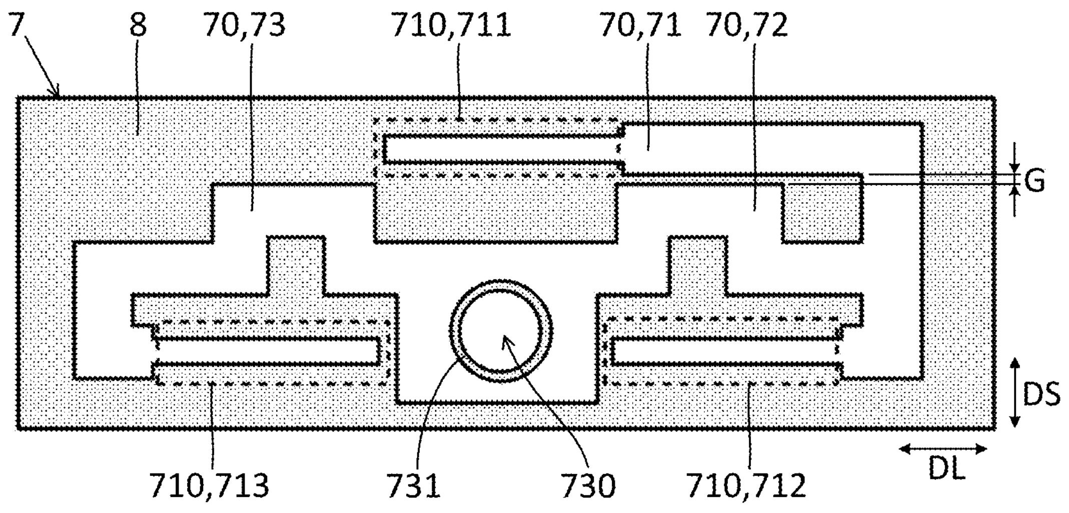
FIG. 11 is a diagram for describing a disadvantage caused when the suction air passage is bent on a horizontal plane.

In addition, in order to promote separation of the flushing ink from the gases sucked through the middle receiving port 711, too, it may be possible to adopt the shape illustrated in FIG. 11, for example, as the shape of the suction air passage 71 viewed in the up and down direction. In the example illustrated in FIG. 11, the suction air passage 71 joins the suction air passage 72. In this way, the gases sucked from the middle receiving port 711 passes through the bent part of the suction air passage 72. As a result, the flushing ink can be easily separated from the gases sucked through the middle receiving port 711, too.

However, in the example illustrated in FIG. 11, the suction air passage 71 interferes with the bent part of the suction air passage 72. Specifically, viewed from the up and down direction, an interval G between the suction air passage 71 and the bent part of the suction air passage 72 in the short direction DS is too small. As a result, there will be a disadvantage such as a breakage of the partition between the suction air passage 71 and the bent part of the suction air passage 72. In addition, in the first place, if the interval G is too small, there will be a disadvantage that the suction air passages cannot be formed by the absorbing member 8.

Note that the location of each of the suction air passages 70 viewed in the up and down direction depends on the position of the destination receiving port 710 in the horizontal direction (i.e., the position of the corresponding recording head 40 in the horizontal direction). Therefore, it is difficult to take a countermeasure such as changing the location of the suction air passage 70 viewed in the up and down direction, so as to suppress occurrence of the disadvantage.

In order to cancel the disadvantage described above, it is effective to decrease the air passage diameter of the suction air passage 71 (the width of the suction air passage 71 in the short direction DS in the example illustrated in FIG. 11), for example. However, if the air passage diameter of the suction air passage 71 is decreased, there occurs another disadvantage that the suction force at the middle receiving port 711 connected to the suction air passage 71 becomes lower than that at the other receiving ports 710.

Figure 8:
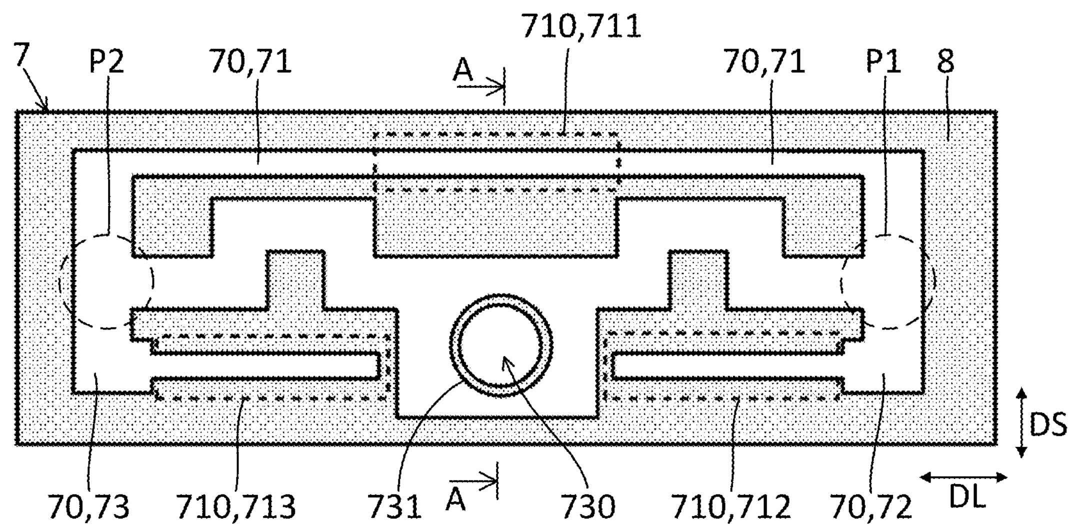
FIG. 8 is a schematic diagram illustrating a storage region of the waste ink container of the inkjet recording apparatus according to the embodiment.
Figure 9:
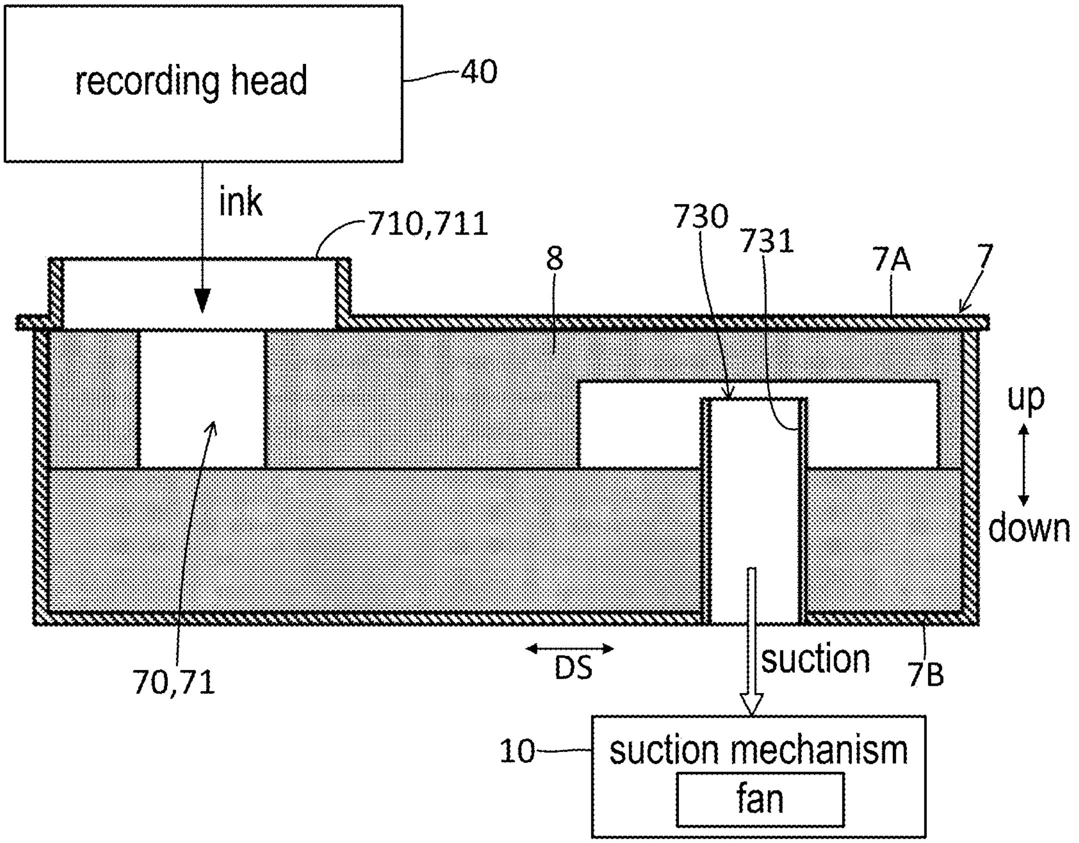
FIG. 9 is a schematic diagram corresponding to a cross section taken along line A-A illustrated in FIG. 8.

Therefore, in this embodiment, as illustrated in FIG. 8, the suction air passage 71 connected to the middle receiving port 711 is divided into a plurality of the suction air passages 71. In other words, the middle receiving port 711 is connected to the plurality of suction air passages 71. On the other hand, the back side receiving port 712 is connected to one suction air passage 72, and the front side receiving port 713 is connected to one suction air passage 73. In this structure, the suction air passage 71 corresponds to a “first air passage”. The suction air passages 72 and 73 each correspond to a “second air passage”.

The middle receiving port 711 is connected to two suction air passages 71. The two suction air passages 71 are connected to different positions of the middle receiving port 711, viewed from the up and down direction. One of the suction air passages 71 is connected to the back side (i.e., one side in the longitudinal direction DL) of the middle receiving port 711, viewed from the up and down direction. The other suction air passage 71 is connected to the front side (i.e., the other side in the longitudinal direction DL) of the middle receiving port 711, viewed from the up and down direction. In other words, the two suction air passages 71 are connected to different positions of the middle receiving port 711, and extend in different directions to each other, viewed from the up and down direction.

The suction air passage 72 extends from the destination back side receiving port 712 to the suction port 730. In addition, the suction air passage 73 extends from the destination front side receiving port 713 to the suction port 730. On the other hand, the two suction air passages 71 connected to the middle receiving port 711 do not extend to the suction port 730.

However, one of the suction air passages 71 joins the suction air passage 72 at a predetermined first position P1. The other suction air passage 71 joins the suction air passage 73 at a predetermined second position P2. In FIG. 8, the first position P1 and the second position P2 are each enclosed by a broken line circle.

In this way, the two suction air passages 71 each communicate between the destination middle receiving port 711 and the suction port 730. One of the suction air passages 71 joins the suction air passage 72, so as to communicate between the destination middle receiving port 711 and the suction port 730 via the suction air passage 72. The other suction air passage 71 joins the suction air passage 73, so as to communicate between the destination middle receiving port 711 and the suction port 730 via the suction air passage 73.

In this embodiment, as the two suction air passages 71 are connected to the middle receiving port 711, the suction through the middle receiving port 711 is performed through the two suction air passages 71. In this way, even if the two suction air passages 71 are formed with a small air passage diameter, the suction force at the middle receiving port 711 can be prevented from being lowered.

In this structure, the air passage diameter of the suction air passage 71 (specifically, the two suction air passages 71) connected to the middle receiving port 711 can be reduced. In this way, the suction air passages 71 connected to the middle receiving port 711 can join the suction air passages 72 and 73, respectively, without interference between the suction air passage 71 and the bent part of the suction air passage 72 or 73.

As the suction air passages 71 join the suction air passages 72 and 73, respectively, the gases sucked through the middle receiving port 711 (the gases containing the flushing ink mist) flows in the suction air passages 72 and 73 separately. The flushing ink can be appropriately separated from the gases flowing in the suction air passage 72, when passing through the bent part of the suction air passage 72. The flushing ink can be appropriately separated from the gases flowing in the suction air passage 73, when passing through the bent part of the suction air passage 73.

As a result, the collection efficiency of the flushing ink in the storage region of the waste ink container 7 is improved. Further, leakage of the flushing ink from the waste ink container 7 can be suppressed. If leakage of the flushing ink from the waste ink container 7 can be suppressed, occurrence of disadvantages such as contamination of inside of the apparatus (e.g., the suction mechanism 10) by the flushing ink can be suppressed.

In addition, if the collection efficiency of the flushing ink in the storage region of the waste ink container 7 is improved, the flushing ink that reaches the suction mechanism 10 is decreased. In this way, a malfunction of a fan can be prevented. Further, as the flushing ink that reaches the suction mechanism 10 is decreased, replacement frequency of a filter disposed in the fan can be reduced.

Note that, in the example illustrated in FIG. 11, in order to prevent the suction air passage 71 connected to the middle receiving port 711 from interfering with the bent part of the suction air passage 72, it is effective to directly connect the suction air passage 71 to the suction port 730 (i.e., to extend the suction air passage 71 from the middle receiving port 711 in the short direction DS), so that the suction air passage 71 is not bent, for example. However, in this case, the flushing ink cannot be efficiently separated from the gases in the suction air passage 71.

On the other hand, in this embodiment, the plurality of suction air passages 70 do not interfere with each other. In other words, in this embodiment, the number of bending times of each of the plurality of suction air passages 70 can be increased easily, without interference between the plurality of suction air passages 70.

In order to prevent the plurality of suction air passages 70 from interfering with each other, a first cross section of each of the two suction air passages 71 connected to the middle receiving port 711 is less than a second cross section of the other suction air passages 72 and 73. In this way, it is easy to prevent the plurality of suction air passages 70 from interfering with each other.

Figure 10:
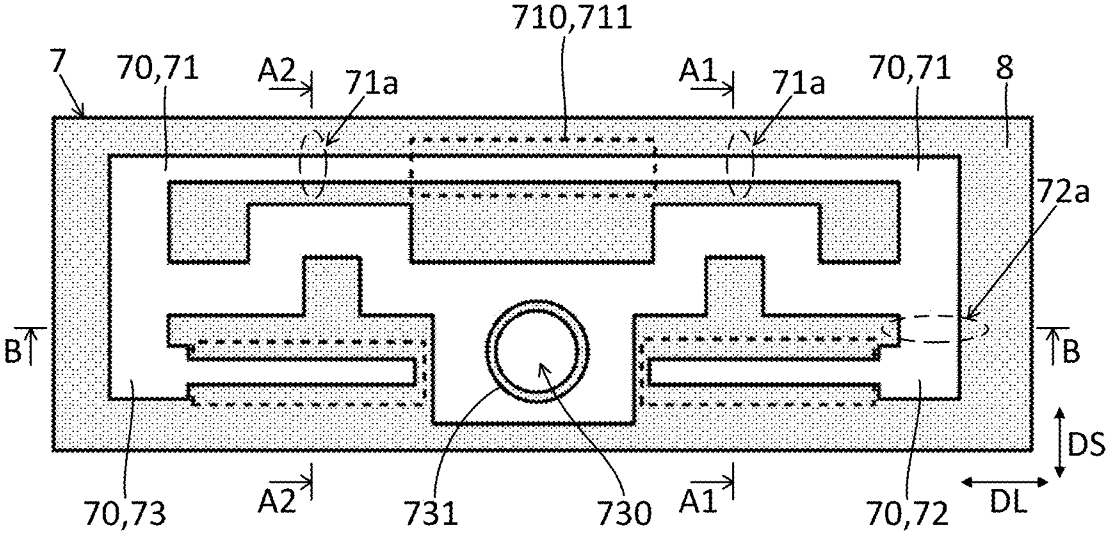
FIG. 10 is a diagram illustrating positions of narrowest parts in suction air passages illustrated in FIG. 8.

The first cross section of the suction air passage 71 and the second cross section of the suction air passage 72 are described with reference to FIG. 10. The first cross section of the suction air passage 71 is a cross section of a narrowest part 71*a* (i.e., a part having the minimum air passage diameter) of the suction air passage 71, taken along a plane perpendicular to a flowing direction of the suction air flow in the suction air passage 71. The second cross section of the suction air passage 72 is a cross section of a narrowest part 72*a* (i.e., a part having the minimum air passage diameter) of the suction air passage 72, taken along a plane perpendicular to the flowing direction of the suction air flow in the suction air passage 72.

Note that the suction air passages 72 and 73 are disposed at positions that are symmetric to each other with respect to the center of the suction port 730, viewed from the up and down direction. In addition, the suction air passages 72 and 73 are formed in shapes that are symmetric to each other with respect to the center of the suction port 730, viewed from the up and down direction. In other words, the suction air passages 72 and 73 have the same shapes. Therefore, the suction air passages 72 and 73 have the same second cross section.

Here, in this embodiment, the sum of the first cross sections of the two suction air passages 71 is the same as the second cross section. In this way, it is possible to suppress occurrence of a large difference of the suction force among the plurality of receiving ports 710.

For instance, if the suction force is decreased in a part of the plurality of receiving ports 710, the sheet S is not sufficiently sucked at the part so that the sheet S may be floated, and hence there may be a disadvantage that the sheet S abuts the recording head 40. Further, the flushing ink is not sufficiently sucked at the part of the decreased suction force among the plurality of receiving ports 710, and hence there may be a disadvantage that the inside of the apparatus is contaminated by the flushing ink. In addition, if a part of the plurality of receiving ports 710 has more suction force than other parts, there may be a disadvantage that the suction force of the part affects the ink so as to land at a deviated position on the sheet S, and hence image quality is deteriorated.

In contrast, in this embodiment, there is not a large difference of the suction force among the plurality of receiving ports 710, and hence it is possible to suppress floating of the sheet S, contamination inside the apparatus, deterioration of image quality, or the like.

In addition, in this embodiment, the absorbing member 8 is disposed in the storage region of the waste ink container 7, and the plurality of suction air passages 70 are formed as spaces without the absorbing member 8 in the storage region. Therefore, collection efficiency of the flushing ink can be easily improved. However, it may be possible to dispose a member, which has a lower absorbing ability of ink than the absorbing member 8 or does not absorb ink, in the storage region of the waste ink container 7, so as to form the plurality of suction air passages 70 using the member.

The embodiment disclosed in this specification is merely an example in every aspect and should not be interpreted as a limitation. The scope of the present disclosure is defined not by the above description of the embodiment but by the claims, and should be understood to include all modifications within meaning and scope equivalent to the claims.

What is claimed is:

1. An inkjet recording apparatus comprising:

a recording head configured to eject ink to a recording medium during conveyance so as to record an image;

a waste ink container disposed to face the recording head in a predetermined direction via a recording medium conveying path, the waste ink container including a storage region inside, so as to store ink ejected from the recording head without being used for image recording, in the storage region; and a suction mechanism configured to suck gases from the waste ink container, wherein the waste ink container has a plurality of receiving ports to receive the ink ejected from the recording head, a suction port disposed at a position apart from each of the plurality of receiving ports viewed from the predetermined direction, so as to be connected to the suction mechanism, and a plurality of suction air passages connected to one of the plurality of receiving ports, so that communication between the destination receiving port and the suction port allows a suction air flow to pass, which is generated when the suction mechanism is driven, the suction air passages include a plurality of first air passages connected to a first receiving port as one of the plurality of receiving ports, and a plurality of second air passages respectively connected to a plurality of second receiving ports other than the first receiving port among the plurality of receiving ports, so as to extend from the destination second receiving port to the suction port, and the plurality of first air passages respectively join the second air passages different to each other, without reaching the suction port, so as to communicate between the first receiving port and the suction port.

2. The inkjet recording apparatus according to claim 1, wherein a first cross section of the first air passage is less than a second cross section of the second air passage, the first cross section is a cross section of a narrowest part of the first air passage, taken along a plane perpendicular to a flowing direction of the suction air flow, and the second cross section is a cross section of a narrowest part of the second air passage, taken along a plane perpendicular to a flowing direction of the suction air flow.

3. The inkjet recording apparatus according to claim 2, wherein the sum of the first cross sections of the plurality of first air passages is the same as the second cross section.

4. The inkjet recording apparatus according to claim 1, wherein the waste ink container includes an absorbing member configured to absorb the ink in the storage region, and the plurality of suction air passages are each formed by a space without the absorbing member in the storage region.

* * * * *